Figure 1:
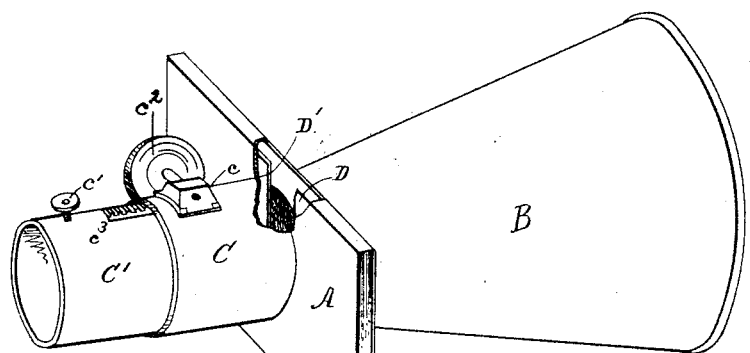

(No Model.)

C. L. KNOX.
CAMERA ATTACHMENT.

No. 445,561. Patented Feb. 3, 1891.

Witnesses.
Thos Houghton.
Saml W. Jacobson.

Inventor
Charles L. Knox
By Lewis Abraham
his Attorney

THE NORRIS PETERS CO., PHOTO-LITHO., WASHINGTON, D. C.

UNITED STATES PATENT OFFICE.

CHARLES LEWIS KNOX, OF NASHVILLE, TENNESSEE, ASSIGNOR OF ONE-HALF TO NATHAN COHN, OF SAME PLACE.

CAMERA ATTACHMENT.

SPECIFICATION forming part of Letters Patent No. 445,561, dated February 3, 1891.

Application filed August 18, 1890. Serial No. 362,362. (No model.)

*To all whom it may concern:*

Be it known that I, CHARLES LEWIS KNOX, a citizen of the United States, residing at Nashville, in the county of Davidson and State of Tennessee, have invented certain new and useful Improvements in Camera Attachments; and I do hereby declare the following to be a full, clear, and exact description of the invention, such as will enable others skilled in the art to which it appertains to make and use the same.

My invention relates to camera attachments, and has for its object the provision of means whereby two or more exposures may be made of the same sensitized plate in succession, the portions of the plate not receiving the image being protected during each exposure, all as hereinafter fully described, illustrated in the drawings, and specifically pointed out in the claims.

Figure 2:
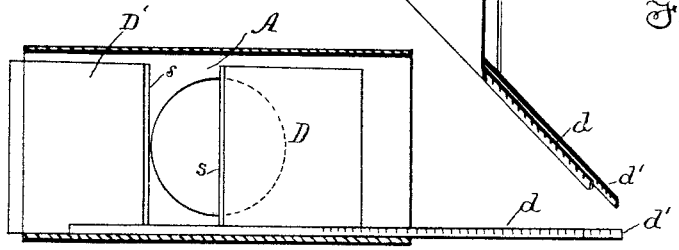
Figure 3:
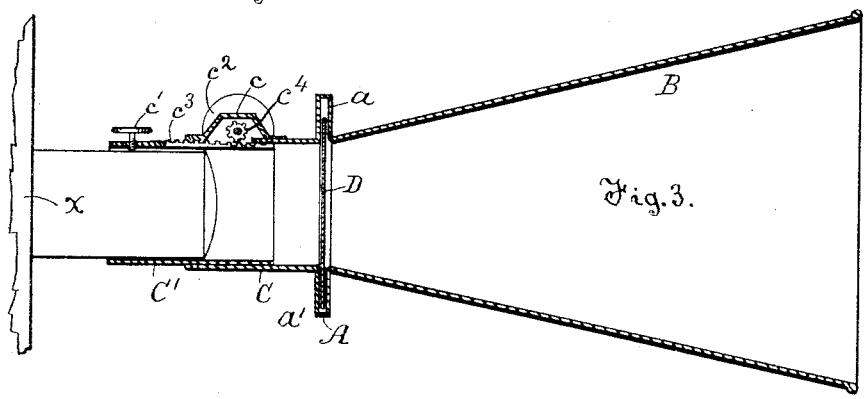
Figure 4:
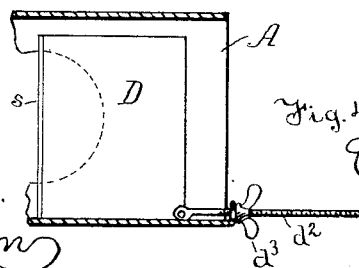

Referring to the accompanying drawings, wherein like letters of reference point out similar parts in all the figures, Figure 1 is a perspective view of my invention, parts being broken away. Fig. 2 is a section of the slide-box, showing glasses in position. Fig. 3 is a longitudinal section of the whole invention, showing portion of an attached camera. Fig. 4 is a section of a portion of the slide-box, showing a modified form of mechanism for moving the glasses.

In the drawings, A is a metal box-slide with its side walls provided with apertures corresponding in size with the lens-tube of a camera on which the device is to be used. Extending outwardly from one of the side walls $a$ is a metal funnel B, of convenient size, preferably about eight inches in length and having a diameter at its flaring extremity of about six inches. The inside of this funnel B is blackened and dull, as usual in tubes of optical instruments, to prevent reflection of disturbing side rays. The smaller end of the funnel is the same size as the aperture in the side $a$ of the slide A, and is soldered, brazed, or otherwise rigidly attached to the edges thereof. To the aperture in wall $a'$ is attached a tube C, within which is a slide-tube C'. The tube C carries a small pinion $c^4$, contained in box $c$ and actuated by milled disk $c^2$. The pinion $c^4$ engages a rack $c^3$, fixed on the sliding tube C', providing an easy and certain means of adjustment, as well known in similar devices. Near the end of the sliding tube C' is a set-screw $c'$, whereby when the tube C' is fitted upon the lens-tube of a camera it may be firmly fixed thereon, as shown in Fig. 3, where X represents a portion of the front of a camera-box and the lens thereof.

The main feature of my invention, as thus far described, is that, as seen by reference to Fig. 3, all light is cut off from the camera-lens, except such direct rays as come through the funnel B, the circular apertures in slide A, and the tube C.

The camera-lens, fitted as thus far described, receives a quantity of light limited by the flaring edge of the funnel B and covering the whole area of the plate to be exposed. Now only a certain portion of this area is to be exposed at one time, and in order to protect the other portions of the plate I introduce two slides of ruby glass D D' into the slide-box A. (See Fig. 2.) The adjacent vertical edges S of these slides D D' are beveled, as shown at $s$, (see Figs. 2 and 4,) in order to reduce the distinctness of their image on the plate. Attached to the lower edge of each slide is a horizontal brass rod or strip. To the left-hand slide is attached the longer strip $d$ and to the right-hand slide is attached the shorter strip $d'$. These strips protrude from the side of the slide-box A, and the protruding portions are provided with scale-indications, whereby the relative positions of the glass slides may be readily adjusted.

The manner of operation of my invention is as follows: Suppose three images or three positions of the same object are to be fixed on the plate one at a time. The tube C' is fitted over the camera-lens tube X and clamped thereon by means of the set-screw $c'$. After approximately focusing, the disk $c^2$ is manipulated, moving the tube C and funnel B backward and forward until a position is found such that the image of the edges of the glass slides shall be somewhat blurred. The glass slides are next adjusted by means of the strips $d\ d'$ to the position shown in Fig.

2. This leaves the left-hand third of the field open and its image clear on the plate, while the remaining two thirds of the plate are protected by the glass. After the left-hand third has been exposed the glasses may be shifted to the right to open the middle third, and then the right-hand third, during each exposure the unexposed portion of the plate being thoroughly protected by the ruby glasses.

Fig. 4 shows a modified method of adjusting the glass slides. As shown, the strips $d$ $d'$ are replaced by a screw-threaded rod $d^2$, reciprocated by means of a thumb-screw $d^3$, held by a fork or ring integral with the slide-box A. This adjustment may be effected in a variety of ways, and I do not wish to be understood as limiting myself to particular means therefor; but the method described—by means of graduated strips $d$ $d'$—I consider preferable.

Having now fully described my invention, what I claim, and desire to secure by Letters Patent of the United States, is—

1. The attachment for cameras, consisting of funnel B, tube C, sliding tube C', provided with set-screw $c'$, slide-box A, and slides contained therein, all in combination, as and for the purpose intended, substantially as described.

2. In the described camera attachment, the slide-box A, at right angles to the axis of the camera-lens, and ruby-glass slides adjustably held therein, as and for the purpose intended, substantially as described.

3. In the described camera attachment, the slides constructed of ruby glass and each provided with a laterally-extending graduated strip or rod whereby the slides may be shifted in the slide-box, as and for the purpose intended, substantially as described.

4. In the described camera attachment, the slide-box A, provided with ruby-glass slides adjustably held therein, the adjacent vertical edges of said slides being beveled, as and for the purpose intended, substantially as described.

In testimony that I claim the invention above set forth I affix my signature in presence of two witnesses.

CHARLES LEWIS KNOX.

Witnesses:
   A. F. McCONNELL,
   NATHAN COHN.